United States Patent
Fahrner (10) Patent No.: US 7,261,175 B1
(45) Date of Patent: Aug. 28, 2007

(54) POWER ASSISTED BICYCLE

(76) Inventor: Todd Fahrner, 1129 SE. 50th Ave., Portland, OR (US) 97215

( * ) Notice: Subject to any disclaimer, the term of this patent is extended or adjusted under 35 U.S.C. 154(b) by 148 days.

(21) Appl. No.: 11/146,982

(22) Filed: Jun. 8, 2005

Related U.S. Application Data (60) Provisional application No. 60/612,430, filed on Sep. 24, 2004.

(51) Int. Cl.
*B62K 17/00* (2006.01)
(52) U.S. Cl. ...................... 180/207; 180/220
(58) Field of Classification Search ............ 180/205, 180/206, 207, 220
See application file for complete search history.

(56) References Cited

U.S. PATENT DOCUMENTS

| | | | |
|---|---|---|---|
| 713,467 A * | 11/1902 | Macdonald | 180/205 |
| 1,097,546 A * | 5/1914 | Harley | 192/217.1 |
| 5,242,028 A * | 9/1993 | Murphy et al. | 180/220 |
| 6,412,800 B1 * | 7/2002 | Tommei | 280/220 |
| 2003/0141126 A1 * | 7/2003 | Hays et al. | 180/207 |
| 2003/0159869 A1 * | 8/2003 | Trerice | 180/205 |
| 2005/0039963 A1 * | 2/2005 | Forderhase | 180/205 |
| 2005/0077096 A1 * | 4/2005 | Kokatsu et al. | 180/205 |
| 2005/0241869 A1 * | 11/2005 | Phillips et al. | 180/205 |

* cited by examiner

*Primary Examiner*—Kevin Hurley
(74) *Attorney, Agent, or Firm*—Albert O. Cota (57) ABSTRACT

A power assisted bicycle (10) which modifies an existing manually powered bicycle (12) by replacing the left pedal crank arm with a motor-driven sprocket and left pedal assembly (32). An electric motor (34) is attached to the bicycle's frame (20) and has attached a motor drive sprocket (35) and a one-way clutch (36). A motor roller chain ring (38) is connected in concert to the motor drive sprocket (35) and motor driven sprocket (32), such that the electric motor (34), provides a power assist to the manually powered bicycle, with the one-way clutch (36) permitting unassisted pedaling without resistance of the motor when de-energized. An electrical power source (40) interfaces with an electrical control system (42) for supplying electrical energy to operate and control the electric motor.

10 Claims, 6 Drawing Sheets

POWER ASSISTED BICYCLE

CROSS REFERENCE TO RELATED APPLICATION

This application claims priority of Provisional Patent Application Ser. No. 60/612,430 filed Sep. 24, 2004.

TECHNICAL FIELD

The invention generally pertains to the field of pedaled crank vehicles and more particularly to a bicycle having a motor driven apparatus that drives the pedaled cranks and chainrings of the bicycle.

BACKGROUND ART

Prior art patents include methods to permit a motor to transmit power to a bicycle wheel without intermediately driving the bicycle's pedal cranks, or to control a bicycle motor's output semi-automatically. These designs frequently entail mounting a motor in a location where it is likely to upset handling or limit ground clearance. The motor can also interfere with the rider's legs, the pedals as normally spaced, the front wheel, or the normal routing of the bicycle's control cables.

The prior art listed below did not disclose patents that possess any of the novelty of the instant invention, however the following U.S. patents are considered related:

| U.S. Pat. No. | Inventor | Issue Date |
| --- | --- | --- |
| 4,280,581 | Rudwick | 28 Jul. 1981 |
| 4,393,954 | Soucy et al. | 19 Jul. 1983 |
| 5,272,938 | Hsu et al. | 28 Dec. 1993 |
| 5,341,892 | Hirose et al. | 30 Aug. 1994 |
| 6,092,820 | Evans | 25 Jul. 2000 |
| 6,152,251 | Nagai et al. | 28 Nov. 2000 |
| 6,672,418 | Makino | 6 Jan. 2004 |

| Patent Application Publication | | |
| --- | --- | --- |
| 2003/0141126 | Hays et al. | 31 Jul. 2003 |
| 2003/0159869 | Terice | 28 Aug. 2003 |

Rudwick in U.S. Pat. No. 4,280,581 teaches an electrically assisted bicycle utilizing an elongated frame such that a storage battery and motor may be mounted at a low level between the bicycle's pedals and rear wheel. The motor and pedals are efficiently coupled so that either or both simultaneously power the drive wheel.

U.S. Pat. No. 4,393,954 of Soucy et al. is for a bicycle having a motor with a sprocket and a chain attached to another sprocket engaging a pedal crank shaft. The motor rotation engages the pedal crank shaft to impart its movement to the shaft. The shaft is disengaged when power is transmitted from a power output member to a power input member.

U.S. Pat. No. 5,272,938 issued to Hsu et al. is for a flat rim motor drive mechanism for driving a bicycle. A DC motor includes a rotor made of a multi-layer mylar film rotor coil fastened inside a housing that is coupled to the spokes of a bicycle wheel Hirose et al. in U.S. Pat. No. 5,341,892 discloses a motor and pedal driven bicycle. The battery powered motor driving unit is divided into two sections: the motor and a speed reducer, and has a fixed portion secured to a hub spindle.

Evans in U.S. Pat. No. 6,092,820 teaches a cargo support device that increases the carrying capacity of standard bicycles. The device includes a base extension frame mounted to a bottom bracket with the bicycle's original chain extended.

U.S. Pat. No. 6,152,251 issued to Nagai et al. teaches a bicycle power unit. The battery unit is arranged so as to be operatively connected to the power unit at a lowest position on a V-shaped leg space that extends the bicycle in a horizontal direction.

Makino in U.S. Pat. No. 6,672,418 discloses a torque sensor for a motor-assisted, manually operated vehicle. The torque sensor is operated by a differential transmission that transmits no driving force for the vehicle, therefore it may be made of a light weight, low cost material. A variety of differential transmissions are also disclosed utilizing either one of two coupled planetary transmissions.

Patent Application Publication No. 2003/0141126 of Hays et al. teaches a bicycle with an electric motor. Outer sprockets are independently turned by either the motor or the bicycle's pedals, with an inner sprocket driving the bicycle's rear wheel. Either the motor, pedals or both propel the bicycle.

Patent Application Publication No. 2003/0159869 applied for by Terice is for the motorization of a conventional bicycle with the addition of a driven gear to the bicycle's chain gear in a bottom bracket area. A motor with a one way clutch is strapped to the bicycle's frame and powers the chain gears.

DISCLOSURE OF THE INVENTION

An apparatus and a method is disclosed that drives the pedaled cranks and chainrings of a bicycle by means of a motor. The power from the motor is transmitted to the bicycle's driven wheel and is the sum of that provided by the rider and the motor, and the full range of the bicycle's existing multi-speed gearing that can be employed to apply the power variably as torque and speed.

The motor, which is mounted preferentially between the bicycle's seat tube and rear wheel, has a drive sprocket mounted on its left side. The motor drive sprocket transfers the rotational movement to a motor driven sprocket mounted in the same plane on the left side of the bicycle's crank axle spindle by means of a chain. The motor driven sprocket in turn drives both pedals and the chainring or rings on the right side of the bicycle, thereby driving the rear bicycle wheel in the usual manner. Mechanically, the inventive design closely resembles common "crossover" tandem bicycle drive train designs, but instead of a second rider a motor is utilized. The motor and gearing characteristics are selected so that the driven pedal speed does not exceed that which the bicyclist can comfortably match. A one-way freewheeling clutch integral with the motor's drive sprocket permits unassisted pedaling without resistance from the motor. Operation of the motor, however, compels the rider to pedal.

Power-assisted bicycles have typically provided reluctant or unfit bicyclists relief from hard work in transporting only themselves. The present invention is offered as a means of enabling fit bicyclists to accomplish work normally relegated to much heavier vehicles, such as transporting heavy cargo or passengers in hilly terrain, with trip times comparable to those of automobiles in urban environments.

Because it is uncomfortable and wasteful of motor power to let one's legs be forcibly driven by the cranks, motor-driven cranks solicit a significant power contribution from the rider, thus elevating the bicycle's overall performance and the rider's physical condition. Furthermore, a fixed-ratio coupling of the motor's rotation to that of the rider's legs assures that the motor's power and efficiency will be maintained at desirable levels as the bicyclist shifts gears to regulate his or her own pedaling cadence.

These along with other beneficial characteristics and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for a power assisted bicycle 10. The preferred embodiment, as shown in FIGS. 1 through 7, is comprised of a manually powered bicycle 12 having a frame 20, a bicycle drive sprocket 22, a bicycle driven sprocket 24, a bicycle roller chain ring 26 that connects the bicycle drive sprocket 22 to the bicycle driven sprocket 24, and the bicycle 12 having a pair of pedal crank arms 28 manually rotating the bicycle drive sprocket 22. This bicycle drive sprocket 22 consists of at least one sprocket, and the bicycle driven sprocket 24 may also be a single sprocket or a plurality of sprockets, according to the type of bicycle that is utilized as a component of the invention.

The invention is versatile enough to be incorporated into a wide variety of manually operated vehicles, such as a conventional diamond frame bicycle, an elongated wheelbase bicycle, a tandem bicycle (less second "stoker" rider), a cargo bike, a recumbent bicycle, or a tricycle. It should be realized that the invention may function properly on almost any pedaled vehicle that presents an adequately strong mounting structure and sufficient clearance of structural and control members, along with sufficient clearance for the rider's legs. The short wheelbases and large wheel diameters of conventional diamond frame bicycles are not the best candidates, however structural modifications may be made to the frame that would allow full affordances.

The most appropriate frame style, which requires the least changes, is the style of bicycle having an elongated structure at the rear of the rider's seat, such as taught in U.S. Pat. No. 6,092,820 issued to Evans. FIGS. 1-3 and 6 illustrate this frame style as the preferred embodiment of the invention. It is also feasible to mount the inventive elements on the tandem bicycle mentioned above by replacing the space for a second rider with the appropriate elements, or in front of the rider on some cargo bicycles, as well as mounted to the forward boom of recumbent cycles.

The basic modification to the bicycle 12 is limited to exchanging the original left-side crank arm with a motor-driven sprocket and left pedal assembly 32. The bicycle crank axle spindle 30 has a right end 30' and a left end 30", with the bicycle drive sprocket 22 connected adjacent to the right end 30' along with the right pedal crank arm 28 while the motor-driven sprocket and left pedal assembly 32, is connected to the spindle left end 30". The outer diameter of the motor driven sprocket of the motor-driven sprocket and left pedal assembly 32 may vary to match the motor characteristics to the preferred pedaling speed, however an acceptable sprocket is the 48 tooth variety which has proven to function admirably. The motor-driven sprocket and left pedal assembly 32 is illustrated pictorially in FIG. 1 and schematically in FIGS. 2-4, and is represented in block diagram in FIG. 7.

An electric motor 34 is attached to the bicycle frame 20 and includes an outward-extending drive shaft 34' with a motor drive sprocket 35 that incorporates a one-way clutch 36 attached thereonto. The motor drive sprocket 35 is preferably the BMX style drive sprocket, with the one-way clutch 36 integrally joined therewith.

There are many and varied types of electric motors that will function properly in the invention and therefore the specific type of motor is not limited to the style illustrated, however there are definite parameters that permit the invention to function properly. It has been found that the motor 34 functions best at a rotational speed that permits a 3:1 speed reduction to rotate the 48 tooth motor driven sprocket 32, which in practice operates optimally with a 16 tooth BMX style motor drive sprocket 32 driving a 48T motor roller chain ring 38. Since the 3:1 ratio is optimal and the motor driven sprocket 32 is somewhat limited in diameter, the motor 34 should have desirable power and efficiency characteristics at an output speed of below 400 revolutions per minute (RPM). It has been found that a motor with the rotor and stator reversed in an "inside-out" configuration, with the stator windings fixed to the stationary axle and the rotor integral with the motor's cover turning on bearings at the shaft, has proven to appropriately function in the application. In this type of motor the rotor and bearings are the only moving parts, and operation is thus virtually silent. As an example a motor operating on 36 volt dc, the motor consumes at peak 575 watts, and when operated at a continuous 210 watt consumption the efficiency is near 80% however these parameters may change significantly, and in due time they will likely become more productive.

As described above the motor roller chain ring 38 is connected in concert with the motor drive sprocket 35 and motor driven sprocket 32, such that the electric motor 34 provides a power assist to the manually powered bicycle 12, with the one-way clutch 36 permitting unassisted pedaling without resistance of the deactivated motor 34. With the motor 34 turned off, the bicycle 12 functions in the normal manner as if no power assist is provided. When the motor 34 is energized, the pedals of the bicycle 12 are turned by the motor 34, thus requiring the rider to also apply force to the rotating pedals which accomplishes the assist but does not permit the rider to allow the motor to propel the bicycle by itself. Since the rider has control of the speed of the motor 34 and its on/off function, the remainder to the bicycle's functions are unaltered, therefore changing gears and braking operates in the normal manner.

Figure 5:
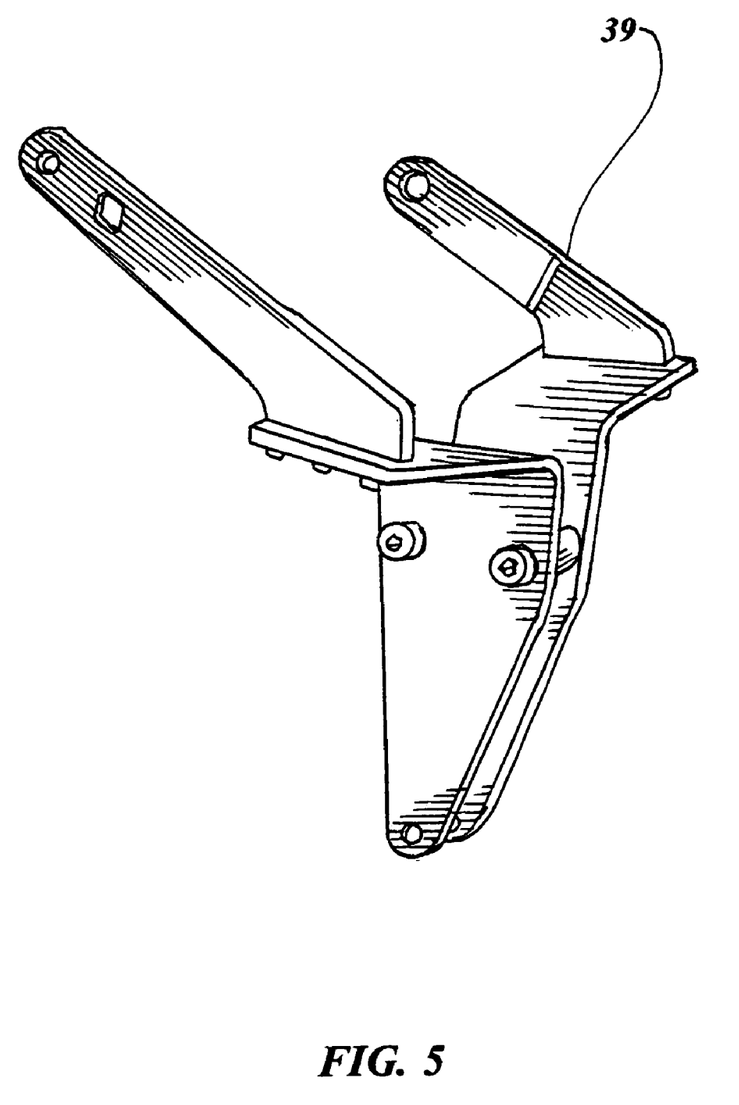
FIG. 5 is a partial isometric view of a typical mounting bracket for attachment of the motor to the frame of an elongated wheelbase bicycle in a representative embodiment.

A mounting bracket 39 is employed for attaching the electric motor 34 to the manually powered bicycle 12. The bracket 39 may be of almost any configuration as required by the actual style and manufacturer's design since different manufacturers produce bicycles is unique styles and new models are consistently being introduced. FIG. 5 illustrates a typical mounting bracket 39 which is representative of mounting to an elongated wheelbase bicycle. Preferably, the bracket 39 is attached to the bicycle 12 on a seat tube, which usually has sufficient strength and is close to the motor 34. However, in some instances the seat tube must be reinforced to provide the necessary structural integrity.

Figure 1:
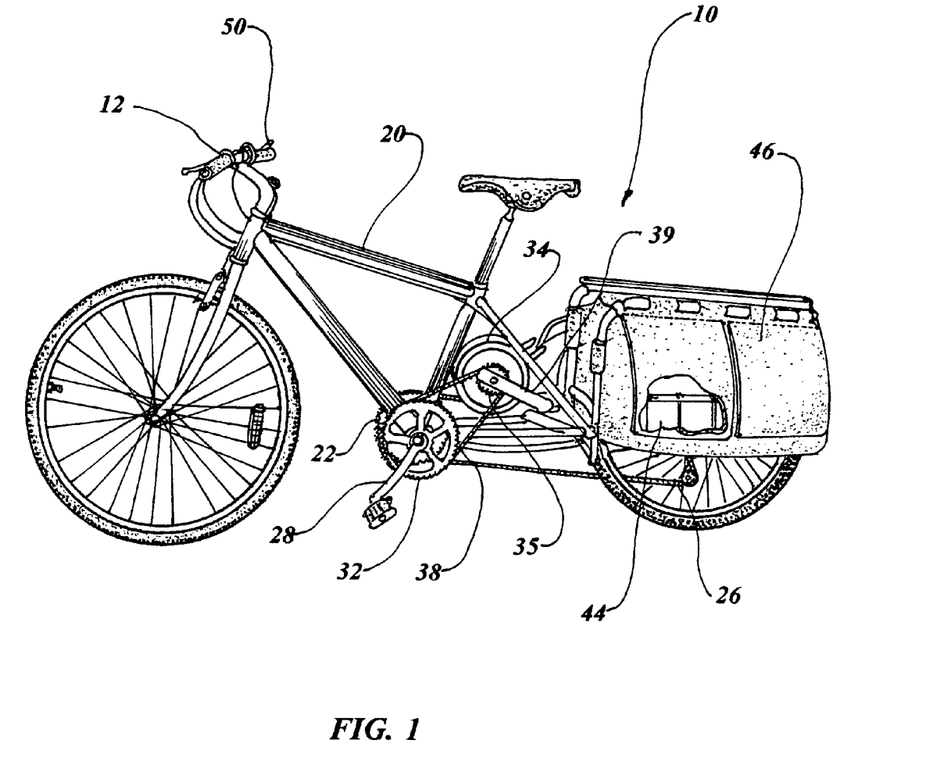
FIG. 1 is a partial isometric view of the preferred embodiment.
Figure 2:
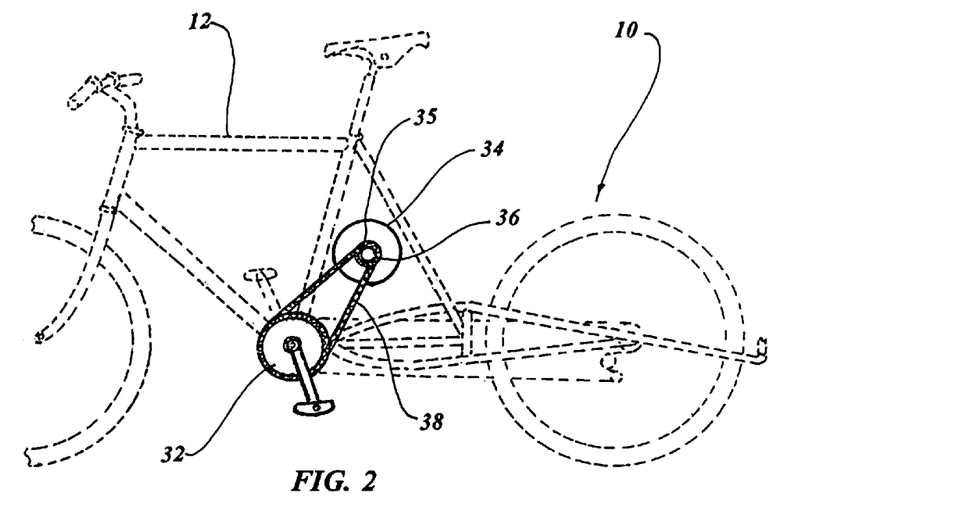
FIG. 2 is a fragmentary left side view of the preferred embodiment illustrating the component parts of the invention in solid lines and bicycle components shown with dash lines.
Figure 3:
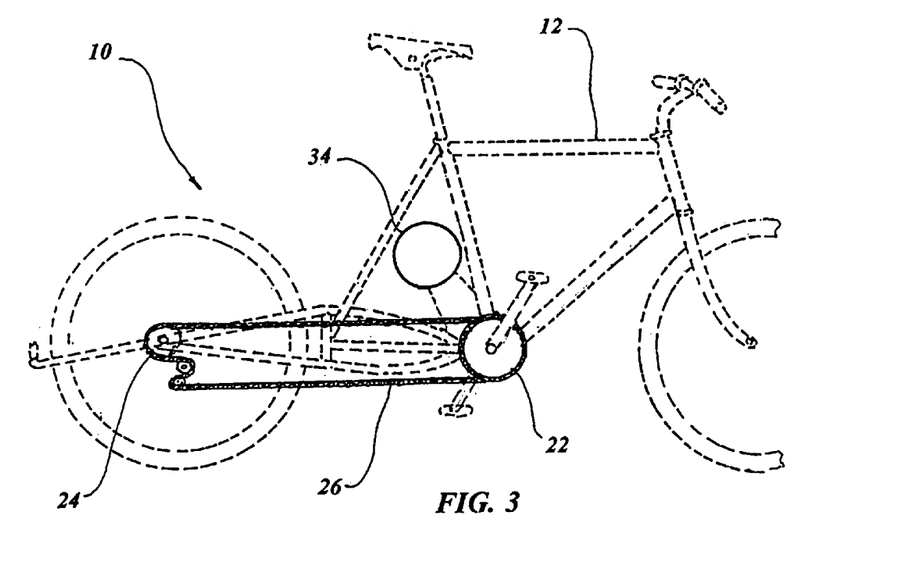
FIG. 3 is a fragmentary right side view of the preferred embodiment illustrating the component parts of the invention in solid lines and bicycle components shown with dash lines.
Figure 4:
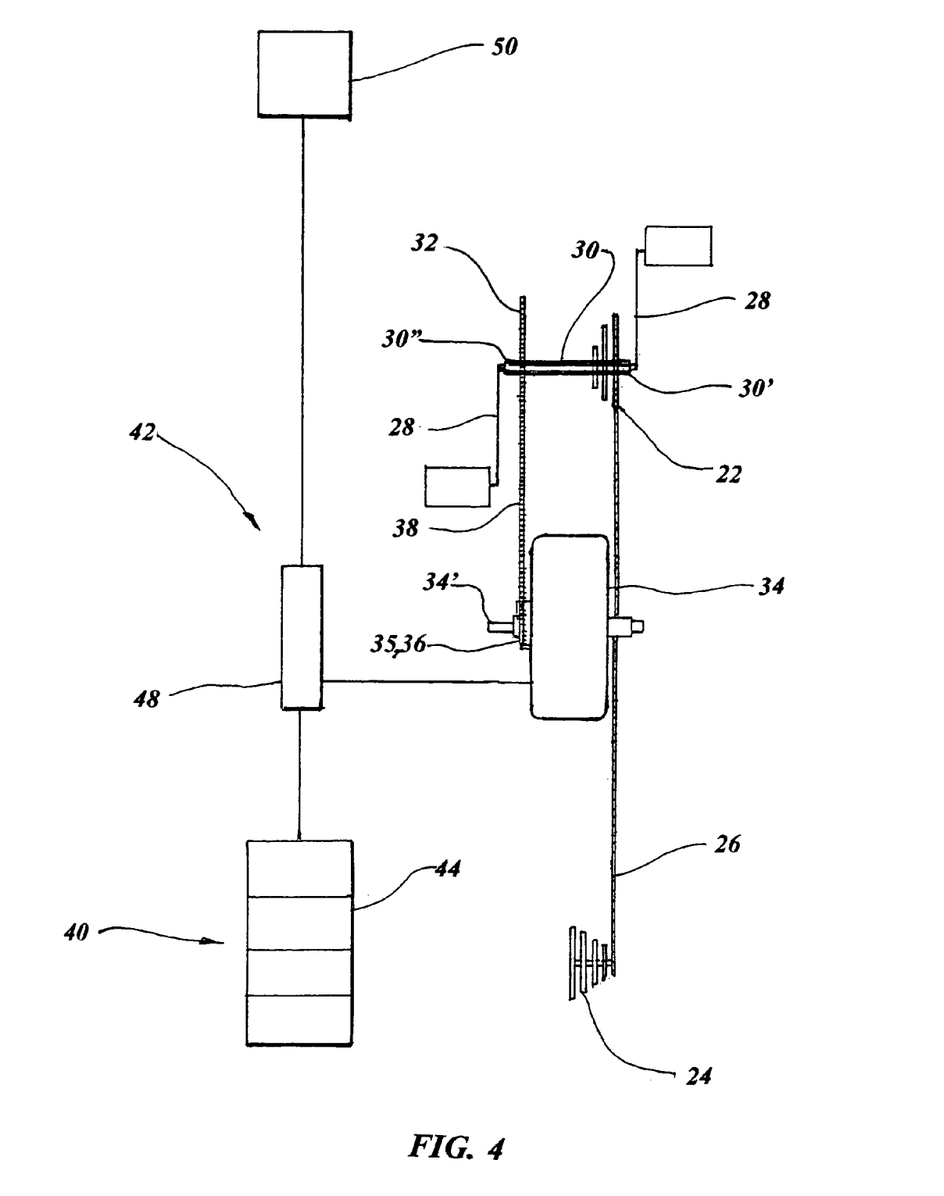
FIG. 4 is a mechanical schematic of the preferred embodiment viewed from the top without the bicycle.
Figure 6:
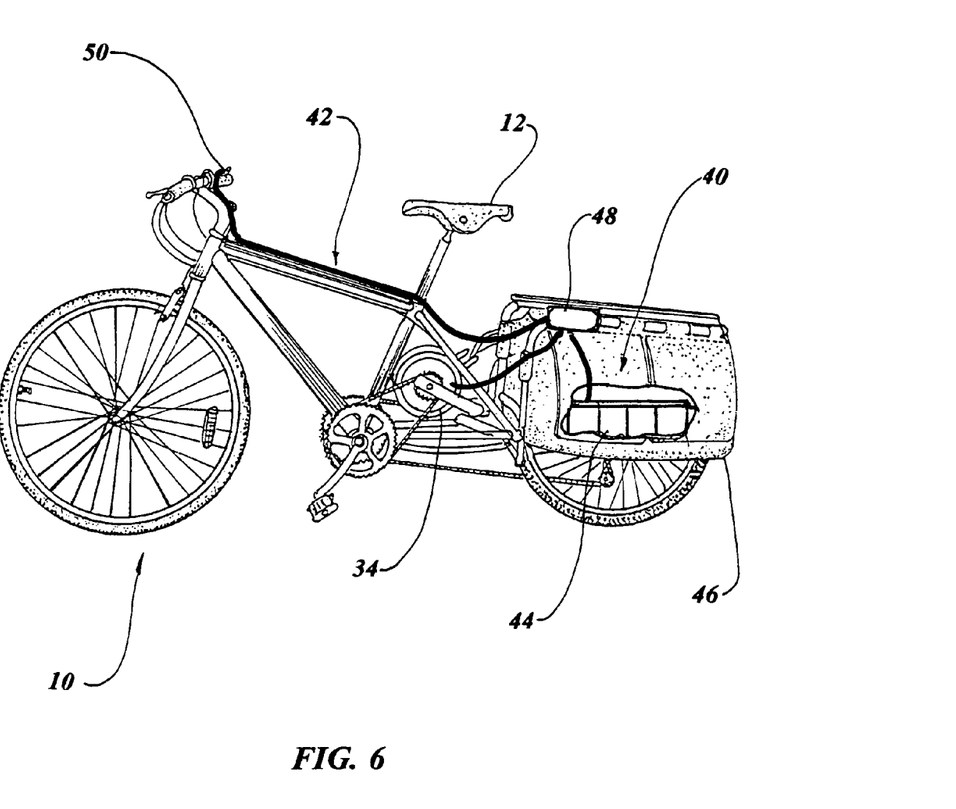
FIG. 6 is a partial isometric left side view of an elongated wheelbase bicycle with the electrical system illustrated with heavy dark lines.

An electrical power source 40 interfaces with an electrical control system 42 for supplying electrical energy to operate and control the electric motor 34. The electrical power source 40 preferably consists of one or more batteries 44, such as a lithium battery, a nickel-metal hydride battery or a lead acid battery. The preferred single battery or battery pack is either a lithium ion type or a nickel metal hydride type that supplies 36 volts dc in the 324Wh to 468Wh capacity, however any type of battery may be easily used with equal ease and dispatch. Mounting the battery or battery pack in cargo slings 46 appears to be the most convenient, as illustrated in FIGS. 1 and 6, since the use of slings keeps the center of gravity low and near the center. Because the slings 46 are usually formed of a fabric material and they are suspended vertically, they flex in response to normal pivotal movement of the bicycle, which helps to dampen the torsion and other forces transmitted to the frame. However, there are a myriad of locations for mounting the batteries that would prove satisfactory, including bags, straps, containers and brackets attached to the frame in some manner.

Figure 7:
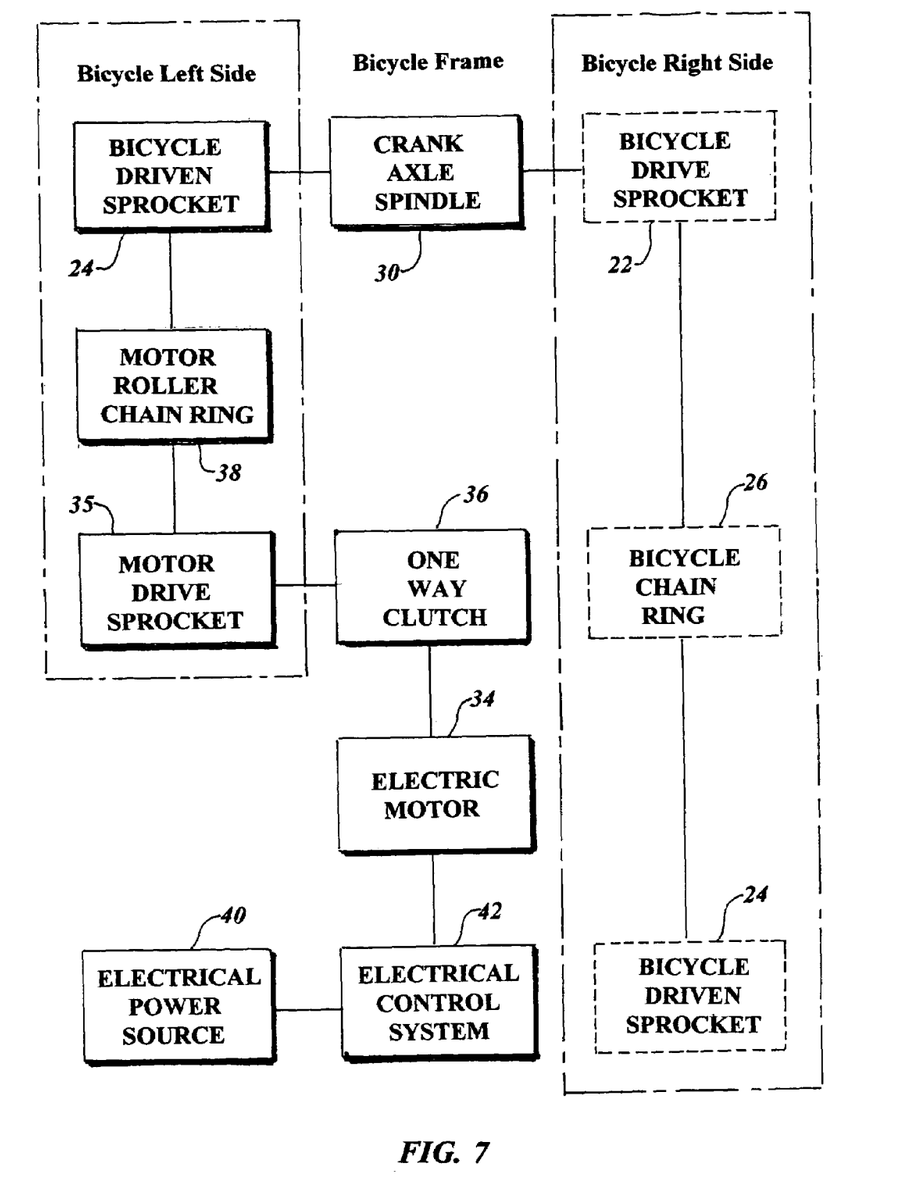
FIG. 7 is a block diagram of the preferred embodiment with the bicycle elements shown in dashed lines.

The electrical control system 42 consists of a controller 48 and a manual throttle 50, which electrically interface together with the electric motor 34 and the electrical power source battery or batteries 44. FIGS. 6 and 7 illustrate the control system 42 in its preferred physical location and in its diagrammatic relationship. The controller 48 may be any solid state device that regulates motor voltage at the demand of a manual throttle 50, which in turn regulates the speed of the electric motor 34. The throttle 50 may also be of any type or style that permits manual regulation by utilizing an analog or a digital signal, such as a potentiometer or rheostat. The throttle 50 is best located on the bicycle handlebars for easy access, the controller 48 may be positioned alternatively.

The power assisted bicycle 10 may be constructed using a factory supplied retrofit kit, which is to be mounted on an existing manual powered bicycle 12. The kit includes the following: a crank/motor-driven sprocket assembly for replacing the existing left crank arm, a motor driven sprocket 32 for attachment to the extended spindle, an electric motor 34 to drive the motor driven sprocket 32, a mounting bracket 39 for attaching the motor 34 to the existing bicycle 12, a motor drive sprocket 35 with a one-way clutch 36 for attachment to the motor 34, a motor roller chain ring 38 for connecting the motor drive sprocket 35 to the motor driven sprocket 32, an electrical power source 40, and an electrical control system 42 to energize and control motor speed.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A power assisted bicycle which comprises:
   a) a manually powered bicycle having a frame, a bicycle drive sprocket, a bicycle driven sprocket, a bicycle roller chain ring connecting the bicycle drive sprocket to the bicycle driven sprocket, and said bicycle having a right pedal crank arm and a left pedal crank arm attached to a spindle, which manually rotates the bicycle drive sprocket,
   b) a motor driven sprocket and left pedal assembly replacing the bicycle left pedal on the bicycle spindle,
   c) an electric motor attached to the bicycle frame, said motor having an outward-extending drive shaft with a motor drive sprocket and a one-way clutch, attached onto said drive shaft,
   d) a motor roller chain ring connected in concert with the motor drive sprocket and motor driven sprocket of the motor-driven sprocket and left pedal assembly, such that the electric motor provides a power assist to the manually powered bicycle, with the one-way clutch permitting unassisted pedaling without resistance of the de-energized motor, and
   e) an electrical power source interfacing with an electrical control system for supplying electrical energy to operate and control the electric motor, wherein said electrical control system further comprises a controller aid a manual throttle which electrically interfaces together with said electric motor and said electrical power source.

2. The power assisted bicycle as recited in claim 1 wherein said manually powered bicycle drive sprocket and driven sprocket further comprise at least one bicycle drive sprocket and at least one bicycle driven sprocket.

3. The power assisted bicycle as recited in claim 1 wherein said manually powered bicycle drive sprocket and driven sprocket further comprise at least a pair of bicycle drive sprockets a cluster of bicycle driven sprockets.

4. The power assisted bicycle as recited in claim 1 wherein said drive sprocket and one-way clutch attached onto said drive shaft further comprises a drive sprocket, with said one-way clutch integrally joined therewith.

5. The power assisted bicycle as recited in claim 1 wherein said electric motor attached to the bicycle frame further comprises a motor having an output rotational speed that permits a 3:1 speed reduction to rotate the motor driven sprocket.

6. The power assisted bicycle as recited in claim 1 wherein said electric motor attached to the bicycle frame further comprises an output speed of below 400 revolutions per minute (RPM).

7. The power assisted bicycle as recited in claim 1 further comprising a mounting bracket that attaches the electric motor to the manually powered bicycle.

8. The power assisted bicycle as recited in claim 7 wherein said mounting bracket is attached to said bicycle on a seat tube.

9. The power assisted bicycle as recited in claim 1 wherein said electrical power source is defined as a battery selected from the group consisting of: a lithium battery, a nickel-metal hydride battery, and a lead acid battery.

10. A power assisted bicycle which comprises
a retrofit kit having,
an existing manual powered bicycle,
a replacement motor-driven sprocket and left pedal assembly,
an electric motor to drive the motor driven sprocket,
a mounting bracket for attaching the motor to the existing bicycle,
a motor drive sprocket with a one-way clutch for attachment to the motor,
a motor roller chain ring for connecting the motor drive sprocket to the motor driven sprocket,
an electrical power source,
an electrical control system to energize and control motor speed, and
a manual throttle,
wherein said replacement motor-driven sprocket and left pedal assembly is attached to said existing manual powered bicycle, said electric motor is in communication with said motor-driven sprocket, said mounting bracket is attached to the existing bicycle and said electric motor, said motor drive sprocket is attached to said motor, said motor roller chain ring is connected in concert with the motor drive sprocket and the motor driven sprocket, said power source is in electrical communication with said electrical control system, said electrical control system is in communication with said motor, with said electrical control system energizing and controlling motor speed, and said manual throttle electrically interfacing with said electric motor and said electrical power source.

* * * * *